United States Patent [19]

Kegel et al.

[11] Patent Number: 4,749,931
[45] Date of Patent: Jun. 7, 1988

[54] COIL CURRENT CONTROL DEVICE

[75] Inventors: Jacobus A. Kegel, Emmen; Eric S. Trommel, Zoetermeer, both of Netherlands

[73] Assignee: Staat der Nederlanden (Staatsbedrijf der Posterljen, Telegrafie en Telefonie), The Hague, Netherlands

[21] Appl. No.: 33,451

[22] Filed: Apr. 1, 1987

[51] Int. Cl.[4] .............................................. H02P 8/00
[52] U.S. Cl. .................................... 318/696; 318/685
[58] Field of Search ................ 318/696, 685; 307/352, 307/355

[56] References Cited

U.S. PATENT DOCUMENTS 4,121,120 10/1978 Wetterling ......................... 307/352
4,129,810 12/1978 Harshberger, Jr. ................. 318/317

FOREIGN PATENT DOCUMENTS 2361003  6/1975 Fed. Rep. of Germany .
2539259  7/1984 France .
59-204497 11/1984 Japan .
59-204498 11/1984 Japan .
59-204499 11/1984 Japan .

OTHER PUBLICATIONS

Feinworktechnik+Messtechnik, vol. 82, No. 5, 1974, R. Weinbeck "Ansteuerprinzipien für Schrittmotoren und Einsatzbeispiele in der Datenverarbeitung".

Primary Examiner—William M. Shoop, Jr.
Assistant Examiner—Saul M. Bergmann
Attorney, Agent, or Firm—Frishauf, Holtz, Goodman & Woodward

[57] ABSTRACT

A coil current control device for e.g. a microstepping motor includes a coil (L), switching means (S), control means including a comparator (C) and a current measuring device (R). The coil can be alternately connected to a positive first voltage source ($U_1$) or to a negative second voltage source ($U_2$) by the switching means, under the control of a binary control signal (b), supplied by the control means. In the control means a reference signal (r) is compared with a measuring signal (m), proportional to the actual coil current (i) and supplied by the current measuring device. The binary control signal has a first level if the measuring signal is smaller than the reference signal or a second level if the measuring signal is larger than the reference signal, respectively. The first level of the control signal activates the switching means to connect the coil to the first voltage source, causing the coil current to increase; the second level of the control signal activates the switching means to connect the coil to the second voltage source, causing the coil current to decrease. To avoid undesired oscillations in the control circuit the precise moment of changing the first level into the second level and v.v. can be controlled by means of a clock pulse (p), supplied by a clock pulse generator (I).

4 Claims, 2 Drawing Sheets

COIL CURRENT CONTROL DEVICE

BACKGROUND OF THE INVENTION

1. Field of the Invention

This invention relates to a current control device and more particularly to such a control device for a stepping motor.

2. Description of the Prior Art From the U.S. Pat. No. 4,129,810, "Switching Motor Control System", filed May 3, 1976 by Robert P. Harshberger, Jr., is known a current control device for a DC motor. This known device comprises a motor coil, a positive first current source and a negative second current source to which the motor coil can be alternately connected by means of switching means. These switching means are controlled by control means which comprise comparing means for comparing a measuring signal with a reference signal. The measuring signal is proportional to the actual coil current; the reference signal is proportional to a (desired) motor or coil parameter (at a certain moment), e.g. the motor velocity or the coil current.

If there is a difference between the measuring signal and the reference signal, the amplitude of this difference will be converted into a binary control (error) signal. This binary control signal is a bistable digital signal which indicates the (size of the) difference between the measuring signal and the reference signal by relative time durations of two different stable signal levels of the digital control signal. The first signal level causes the switching means to connect the motor coil to the first current source; the second signal level causes the switching means to connect the motor coil to the second current source respectively. The digital control signal continues to switch the switching means with an average period corresponding to a (fixed) clock (and sample) frequency. In other words, the amplitude of said difference between the measuring signal and the reference signal is converted into a binary, pulse width modulated signal of a certain (fixed) frequency.

A serious disadvantage of the known current control device is the required relatively high frequency of the binary control signal. For this reason the said switching means require a high energy dissipation capacity. The known control device cannot be applied to control a stepping motor, especially a stepping motor which is able to make very little steps ("microsteps") with a high velocity. The reason is that for achieving microsteps with a high velocity the reference signal has to change very quickly. The required frequency of the binary control signal for this would be thus high that, due to the self-inductance of the coils, the motor torque would be very limited. In other words, the stepping size, the stepping velocity and the motor torque of a (micro)stepping motor controlled by the known control device would be intolerably limited. In addition, if the known control device would control a microstepping motor, the minimum stepping size (given a certain velocity) would always depend on the (fixed) sample frequency of the binary control signal. Thus it would never be possible to achieve steps which are smaller than a certain limited size, due to the fixed nature of the binary control signal frequency.

Concluding, applying the known control device to a (micro)stepping motor suffers from the main disadvantage that the frequency of the binary control signal is fixed, independent of variations of the reference signal: sometimes the frequency is higher than required, causing too much energy dissipation in the switching means and causing limitations to the velocity, stepping size and torque of the motor due to self-inductance, sometimes the frequency is lower than required, causing a limitation of the motor velocity or stepping size.

SUMMARY OF THE INVENTION

A coil current control device, particularly for controlling a stepping motor coil current, includes a coil which can be alternately energized by a positive first current source or a negative second current source respectively, switching means for connecting said coil to said first current source under the control of a binary control signal at a first level or to said second current source under the control of that binary control signal at a second level respectively, control means for supplying said binary control signal at said first or second level respectively to said switching means, including a comparator for comparing a measuring signal with a reference signal, the control means supplying the binary control signal at the first level if the difference between the measuring signal and the reference signal is negative or the binary control signal at the second level if said difference is positive respectively, and a current measuring device for measuring said coil current and delivering said measuring signal to said comparator, proportional to the coil current. The first and the second level of the binary control signal will be changed only if the sign of the difference between the measuring signal and the reference signal changes. Thus the binary control has no fixed frequency as the binary control signal in the known device has. Under control of the first level of the binary control signal the coil will be connected to the first, positive current source if and as long as the value of the measuring signal is smaller than (negative with respect to) the reference signal at that moment. Under control of the second level of the binary control signal the coil will be connected to the second, negative current source if and as long as the measuring signal is larger than (positive with respect to) the reference signal.

To prevent oscillations in the control device, in a preferred embodiment of the present invention a changing of the binary control signal level—due to a changing of the sign of the difference between the measuring signal and the reference signal—can take place only at the end of an interval, determined by two successive clock pulses, the clock pulses being supplied by a clock pulse generator. By this measure only the precise moment at which the level of the binary control signal changes, is determined, that is to say, this moment is delayed for a maximum of one interval.

DESCRIPTION OF THE FIGURES

Figure 1:
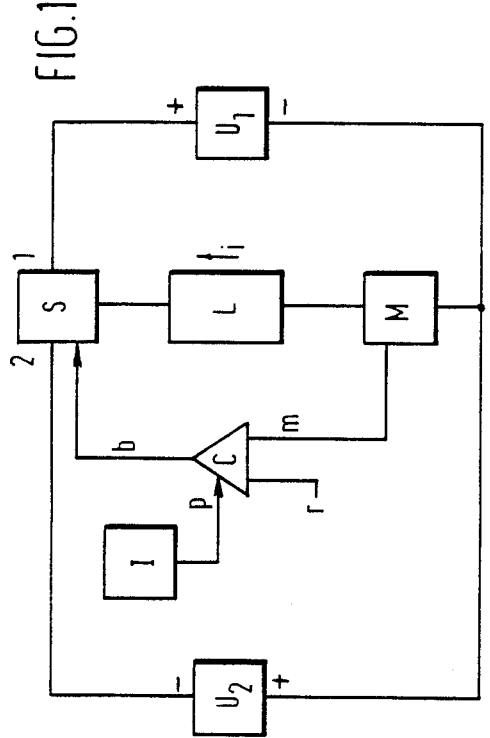
FIG. 1. shows a basic diagram of the device according to the invention.

FIG. 1 shows a coil L, connected via a switching device S either to a voltage source $U_1$ or to a voltage source $U_2$, which voltage sources have a reverse polarity with respect to each other, but apart from that can have an equal terminal voltage. The circuit comprises a current measuring device M, connected in series to the coil L. A measuring signal m corresponding to a current i, which flow through the coil L and the measuring device M, is applied to an input terminal of a comparator C, to another input terminal of which a reference signal r is applied. The output terminal of the comparator C controls the switching device S in such a way that if the measuring signal m is smaller than the reference signal r, the coil L will be connected to the voltage source $U_1$ (position 1 of the switching device S) and to the voltage source $U_2$ (position 2 of the switching device S) if the measuring signal m is larger than the reference signal r. Because of the fact that the coil L is connected to an oppositely polarized voltage source $U_2$ (position 2 of the switching device S) after the measuring signal m has become larger than the reference signal r, the current i will decrease very quickly (and consequently the measuring signal m will). If after this the measuring signal m becomes smaller than the reference signal r, the coil L will be connected to the first voltage source $U_1$ again, due to which the current i will rise. In order to prevent the control circuit from switching undesirably quickly (oscillation), the comparator C has been connected to a clock pulse generator I. The clock pulse generator I transmits clock pulses p to the comparator C. The comparator C can only change its output signal b (level "1" into level "0" or level "0" into level "1") during a reception of such a clock pulse p. If at that moment m<r, the switching device S will be switched into (or remain in) its position 1; if at that moment m>r, the switching device S will be switched into (or remain in) its position 2.

Figure 2:
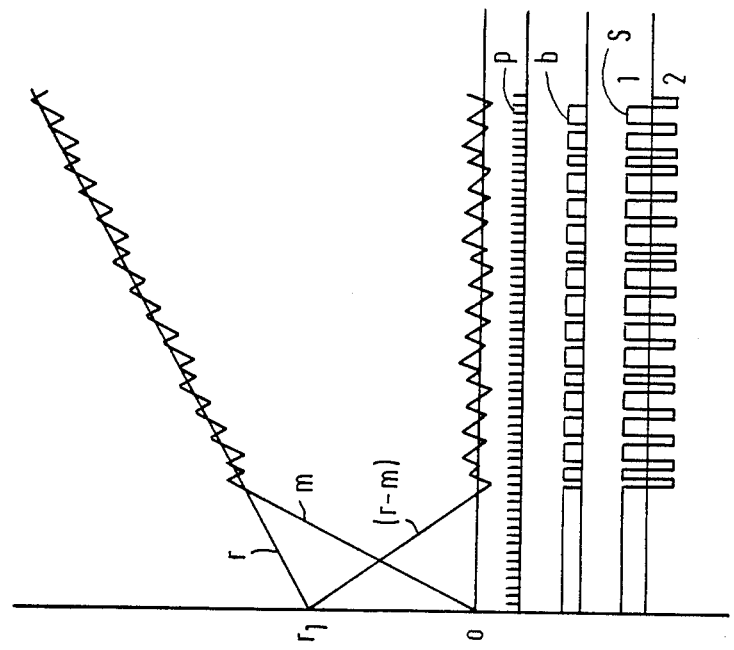
FIG. 2 shows an associated diagram.

FIG. 2 shows the course of the measuring signal m (and, consequently, of the current i) as a function of the time at an increasing value of the reference signal r. The figure also shows the course of the difference (r−m) between the reference signal r and the measuring signal m and, moreover, it represents the clock pulse signal p supplied to the comparator C and the resulting output signal of the comparator C, being the binary control signal b for the switching device S, as well as the consequent consecutive positions 1 respectively 2 of the switching device S.

m=0 and r=rl, the comparator

Starting from the condition that C will give a level "1" as output signal, as a result of which the switching device S will take up the position 1 and as a consequence $U_1$ will be connected to the coil L. Owing to this a current i will start flowing through the coil L, as a result of which the measuring signal m will become larger than 0. On the consecutive reception of the clock pulses p the comparator C will not change said condition as long as m <r ((r−m) >0). On the reception of the first clock pulse p after m has become larger than r ((r−m) <0), the comparator C will make a level "0" appear at its output terminal and this control signal b="0" will make the switching device S change over to its position 2, due to which the coil L will be connected to the voltage source $U_2$, which is reversely polarized with respect to $U_1$. In consequence of this, the current i and consequently the measuring signal m will decrease within a short time. On the reception of a first clock pulse p after m has become smaller than r, the comparator C will change the control signal b into a "1" again, in consequence of which the switching device S will take up its position 1 once again.

By means of the circuit of FIG. 1 a current i through the coil L is obtained in the way described above, which current i can quickly and accurately follow any variation in the reference signal r irrespective as to whether this signal r is rising or falling, positive or negative. The speed at which the variations can be followed and the accuracy are of course dependent on the various parameters, such as the reactance of the coil L, the values of $U_1$ and $U_2$, the clock pulse frequency and also on the speed at which and the accuracy with which the various devices, in this case the comparator C and the switching device S, function. It should be noticed that where in FIG. 2 the rising and falling of m respectively (r−m) have been represented as being linear, it will be clear that in reality they will take place logarithmically.

Figure 3:
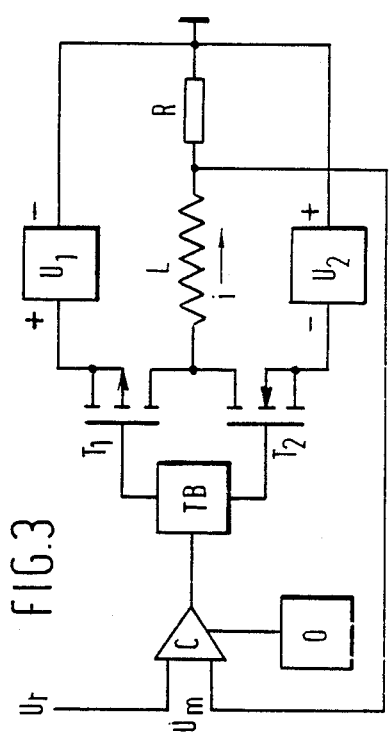
FIG. 3 shows an embodiment of the invention.

In FIG. 3 the current measuring device is a resistor R, the switching device a combination of two field effect transistors (FETs) $T_1$ and $T_2$ and the clock pulse generator an oscillator O. The transistors $T_1$ and $T_2$ are controlled by the output terminal of a comparator C via a transistor control circuit TB. Each of the transistors $T_1$ and $T_2$ is connected to a voltage source $U_1$ respectively $U_2$, which are differently polarized with respect to each other, but have an equal terminal voltage. The terminal voltages of $U_1$ and $U_2$ are relatively high in order to obtain a quick rise respectively fall of the current i through the coil round about the desired instantaneous value, so that also quick fluctuations in the desired value can be followed accurately. The working fully corresponds with the working described in connection with the FIGS. 1 and 2. The measuring signal m, corresponding to the current i, is in this case a measuring voltage Um across the resistor R. The reference signal is a reference voltage Ur. The comparator C only changes its output signal if the signal received from the oscillator O has a positive instantaneous value and the sign of the value (Ur−Um) has, moreover, changed in the meantime. The output terminal of the comparator is connected to the transistor control circuit TB, which converts the binary control signal b into a control current to the one or to the other transistor $T_1$ respectively $T_2$. Besides the transistor control circuit is provided with a small delay circuit, which prevents that the one transistor will already be brought into the conductive state before the other one has completely come into the non-conductive state.

Figure 4A:
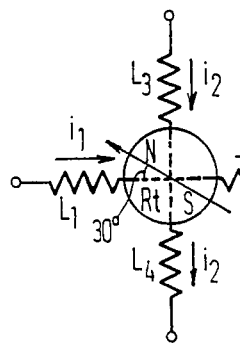
FIGS. 4A–4C show the principle of microstepping.

FIG. 4a shows a diagram of a stepping motor, comprising a rotor Rt and four coils $L_1$-$L_4$, which are connected in series in pairs. The rotor Rt is permanently magnetized. If a current flows only through $L_1$-$L_2$, the rotor Rt will take up a position in the direction of the magnetic field excited by $L_1$ and $L_2$ (horizontal in the figure); likewise if a current flows only through $L_3$-$L_4$, the rotor will take up a position in the direction of the magnetic field of $L_3$ and $L_4$ (vertical). If, however, a current flows not only through $L_1$-$L_2$, but also through $L_3$-$L_4$, the rotor Rt will take up a position which depends on the ratio between and the direction of the respective currents $i_1$ and $i_2$. In this way the position of the rotor Rt can be changed by changing said ratio and/or direction.

The currents $i_1$ and $i_2$ preferably have the value I cos $\alpha$ respectively I sin $\alpha$, in which $\alpha$ is the desired angle of the rotor with respect to the axis of the coil $L_1$-$L_2$, and I is the value of the current $i_1$ respectively $i_2$ when $\alpha=0°$ respectively $\alpha=90°$. Since the resultant $i_r$ of $i_1$ and $i_2=$-

Figure 4B:
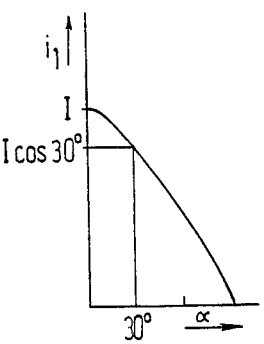
Figure 4C:
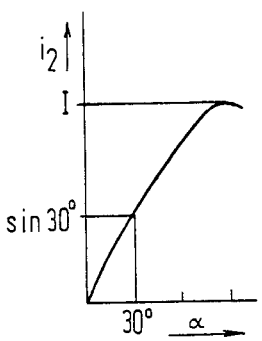

$\sqrt{(i_1^2+i_2^2)}$, in which $i_1=I \cos \alpha$ and $i_2=\alpha \sin \alpha$, is $i_r=\sqrt{(\cos^2\alpha+\sin^2\alpha)}=I$; so for all the values of $\alpha$ $i_r$ is constant and, consequently, also the driving couple of the rotor Rt is constant. FIGS. 4b and 4c show the desired currents $i_1$ respectively $i_2$ as a function of the angle $\alpha$ (drawn for $\alpha=0\ldots 90°$).

Figure 5:
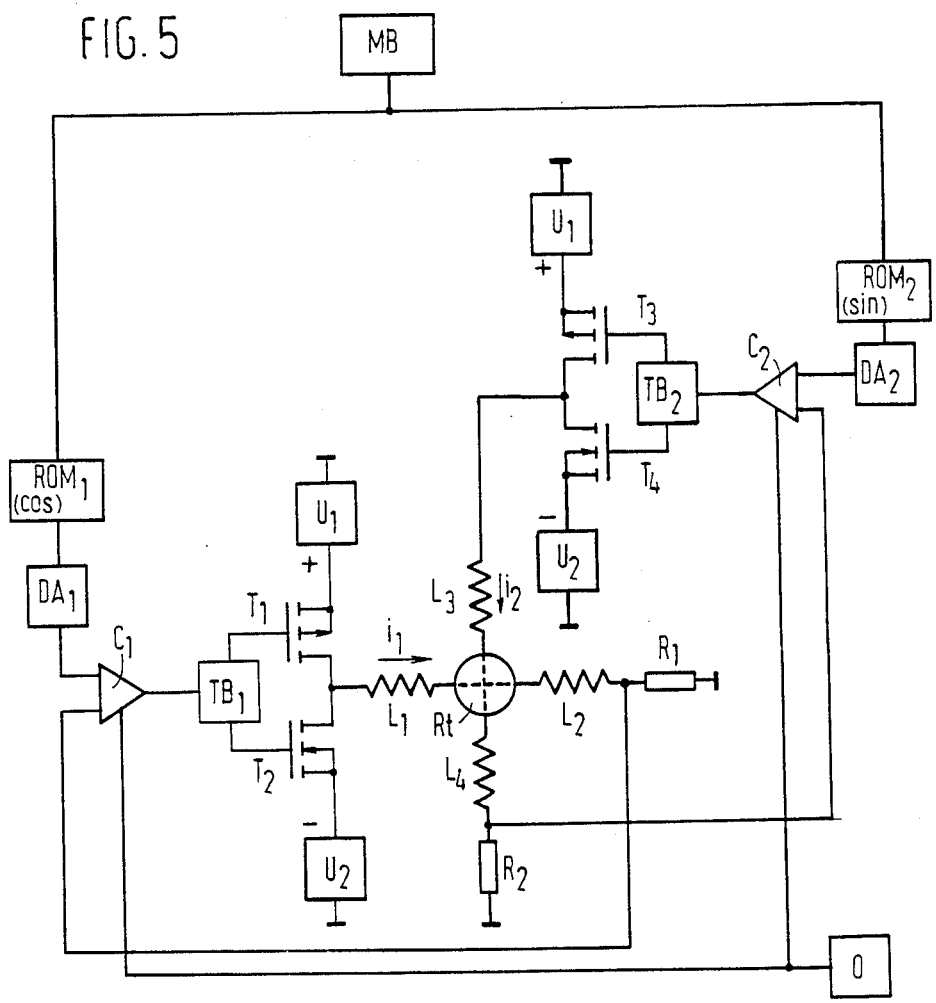
FIG. 5 shows a complete embodiment of a control device for a stepping motor with microstepping facility, comprising two co-operating devices according to the embodiment of the invention shown in FIG. 3.

FIG. 5 finally shows a detailed diagram of a control device for a stepping motor with the possibility of microstepping, provided with two co-operating current control devices according to the embodiment of the invention described above and shown in FIG. 3.

From a motor control device MB, in which the desired number of complete revolutions and the desired final position of the rotor are put in, a number of signal cycles are delivered to two ROMs, $ROM_1$ and $ROM_2$, which each will deliver a digital output signal on reception of an input signal, which output signal corresponds to the cosine respectively the sine of that input signal. For each desired revolution the ROMs receive a number of signal cycles, dependent on the number of pairs of poles of the relevant stepping motor and the type of stepping motor (in this case a stepping motor with permanent magnets or with variable reluctance or a hybrid stepping motor). The ultimate position of the rotor Rt is determined by the values stated by the ROMs as the final state. The digital signals delivered by the respective ROMs are converted by the respective digital-to-analog converters $DA_1$ and $DA_2$ into reference voltages applied to an input terminal of the comparators $C_1$ respectively $C_2$. It is remarked that a motor control device as described above is already known in itself from the Japanese patent publications Nos. 59-204497, 59-204498 and 59-204499. The currents $i_1$ and $i_2$ through the pairs of coils $L_1$-$L_2$ and $L_3$-$L_4$, respectively are controlled in the way described before by means of the transistors $T_1$, $T_2$ and $T_3$, $T_4$, connected to the voltage sources $U_1$ and $U_2$, respectively, which transistors are controlled by the comparators $C_1$ and $C_2$, respectively via the transistor controls $TB_1$ and $TB_2$, respectively, the change of the output signals of the comparators $C_1$ and $C_2$, respectively being controlled by a common oscillator O. The measuring voltages for $C_1$ and $C_2$ are taken off from the measuring resistors $R_1$ and $R_2$, respectively.

Any position of the rotor Rt wanted by the motor control device MB is converted by the ROMs and DA-converters into a corresponding cosine or sine value, respectively, which is applied as a reference voltage to the relevant input terminal of the comparators $C_1$ and $C_2$. Controlled by the oscillator 0 the comparators $C_1$ and $C_2$ control via $TB_1$ and $TB_2$, respectively the transistors $T_1$, $T_2$ and $T_3$, $T_4$, respectively in such a way that the coils $L_1$-$L_2$, and $L_3$-$L_4$, respectively are connected to that voltage source $U_1$ or $U_2$, respectively which quickly changes the current $i_1$ or $i_2$, respectively in the sense desired. Coupling back takes place by applying the voltage across the measuring resistors $R_1$ and $R_2$ to the second input terminal of the comparator $C_1$ or $C_2$, respectively.

We claim:
1. Coil current control device, particularly for an electric motor, comprising:
   a coil (L) which can be alternately energized by a positive first voltage source ($U_1$) or a negative second voltage source ($U_2$), respectively:
   switching means (S) for connecting said coil to said first voltage source by means of a first level of a binary control signal (b), or to the said second voltage source by means of a second level of said binary control signal;
   a current measuring device (M) for measuring said coil current (i) and delivering a measuring signal (m) proportional to the coil current; control means for supplying said first level or second level of said binary control signal to said switching means, including a comparator (c) for comparing said measuring signal (m) with a reference signal (r), the control means supplying the first level of said binary control signal if the difference between said reference signal is negative or supplying the second level of the binary control signal if said difference is positive.

2. Coil current control device according to claim 1, including a clock pulse generator (I) for supplying clock pulses (p) to said control means causing the control means to supply said first level and said second level of said binary control signal respectively to said switching means always for at least one certain interval between two successive ones of said clock pulses.

3. Stepping motor control device comprising:
   at least one stepping motor coil (L) which can be alternately energized by a positive first voltage source ($U_1$) or a negative second voltage source ($U_2$), respectively;
   switching means (S) for connecting said coil to said first voltage source by means of a first level of a binary control signal (b) or to said second voltage source by means of a second level of said binary control signal;
   a current measuring device (M) for measuring said coil current (i) and delivering a measuring signal (m) proportional to the coil current;
   control means for supplying said first or second level of said binary control signal to said switching means, including a comparator (C) for comparing said measuring signal (m) with a reference signal (r), the control means supplying said first level of the binary control signal if the difference between the measuring signal an the reference signal is negative or supplying said second level of the binary control signal if said difference is positive.

4. Stepping motor control device according to claim 3, including a clock pulse generator (I) for supplying clock pulses (p) to said control means causing the control means to supply said first level and said second level of said binary control signal respectively to said switching means always for at least one certain interval between two successive ones of said clock pulses.

* * * * *

UNITED STATES PATENT AND TRADEMARK OFFICE
CERTIFICATE OF CORRECTION

PATENT NO. : 4,749,931

DATED : June 7, 1988

INVENTOR(S) : Jacobus A. KEGEL et al

It is certified that error appears in the above-identified patent and that said Letters Patent is hereby corrected as shown below:

Title page, left-hand column, under the heading "FOREIGN PATENT DOCUMENTS" change the second document (France) "2539259" to -- 2529259 --.

Column 3, line 48, delete in its entirety.

line 49, after "that" insert

-- $m = 0$ and $r = r1$, the comparator --.

Signed and Sealed this

Thirty-first Day of October, 1989

Attest:

DONALD J. QUIGG

*Attesting Officer*  *Commissioner of Patents and Trademarks*